(12) United States Patent
Zhou et al.

(10) Patent No.: US 12,335,850 B2
(45) Date of Patent: Jun. 17, 2025

(54) FULL-DUPLEX CAPABILITY INDICATION FOR CELL SELECTION

(71) Applicant: QUALCOMM Incorporated, San Diego, CA (US)

(72) Inventors: Yan Zhou, San Diego, CA (US); Qian Zhang, Basking Ridge, NJ (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 723 days.

(21) Appl. No.: 17/456,000

(22) Filed: Nov. 22, 2021

(65) Prior Publication Data

US 2023/0164674 A1    May 25, 2023

(51) Int. Cl.
| | |
|---|---|
| *H04W 48/16* | (2009.01) |
| *H04L 5/14* | (2006.01) |
| *H04L 27/26* | (2006.01) |
| *H04W 24/10* | (2009.01) |

(52) U.S. Cl.
CPC ......... *H04W 48/16* (2013.01); *H04L 27/2607* (2013.01); *H04W 24/10* (2013.01); *H04L 5/14* (2013.01)

(58) Field of Classification Search
CPC .. H04W 48/16; H04W 24/10; H04L 27/2607; H04L 5/14
See application file for complete search history.

(56) References Cited

U.S. PATENT DOCUMENTS

| | | | | |
|---|---|---|---|---|
| 2007/0041347 A1* | 2/2007 | Beale | ............... | H04L 5/1438 370/335 |
| 2018/0077612 A1* | 3/2018 | Zheng | ............... | H04W 76/11 |
| 2019/0364586 A1* | 11/2019 | Li | ............... | H04W 72/23 |
| 2022/0182160 A1* | 6/2022 | Su | ............... | H04B 17/309 |
| 2023/0101464 A1* | 3/2023 | Fakoorian | ............... | H04L 5/14 370/280 |

FOREIGN PATENT DOCUMENTS

| | | |
|---|---|---|
| EP | 2827647 A2 | 1/2015 |
| EP | 3895363 A1 | 10/2021 |
| WO | WO2019023885 A1 * | 2/2019 |

OTHER PUBLICATIONS

International Search Report and Written Opinion—PCT/US2022/077339—ISA/EPO—Jan. 9, 2023.

\* cited by examiner

*Primary Examiner* — Christopher M Crutchfield
*Assistant Examiner* — Tito Q Pham
(74) *Attorney, Agent, or Firm* — Harrity & Harrity, LLP

(57) ABSTRACT

Various aspects of the present disclosure generally relate to wireless communication. In some aspects, a user equipment (UE) may receive signaling that indicates full-duplexing capability information associated with one or more candidate cells. The UE may select, from the one or more candidate cells, a target cell based at least in part on the full-duplexing capability information associated with the one or more candidate cells. Numerous other aspects are described.

30 Claims, 10 Drawing Sheets

FULL-DUPLEX CAPABILITY INDICATION FOR CELL SELECTION

FIELD OF THE DISCLOSURE

Aspects of the present disclosure generally relate to wireless communication and to techniques and apparatuses associated with a full-duplex capability indication that may be used for cell selection.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a user equipment (UE) for wireless communication. The UE may include a memory and one or more processors coupled to the memory. The one or more processors may be configured to receive signaling that indicates full-duplexing capability information associated with one or more candidate cells. The one or more processors may be configured to select, from the one or more candidate cells, a target cell based at least in part on the full-duplexing capability information associated with the one or more candidate cells.

Some aspects described herein relate to a method of wireless communication performed by a UE. The method may include receiving signaling that indicates full-duplexing capability information associated with one or more candidate cells. The method may include selecting, from the one or more candidate cells, a target cell based at least in part on the full-duplexing capability information associated with the one or more candidate cells.

Some aspects described herein relate to a non-transitory computer-readable medium that stores a set of instructions for wireless communication by a UE. The set of instructions, when executed by one or more processors of the UE, may cause the UE to receive signaling that indicates full-duplexing capability information associated with one or more candidate cells. The set of instructions, when executed by one or more processors of the UE, may cause the UE to select, from the one or more candidate cells, a target cell based at least in part on the full-duplexing capability information associated with the one or more candidate cells.

Some aspects described herein relate to an apparatus for wireless communication. The apparatus may include means for receiving signaling that indicates full-duplexing capability information associated with one or more candidate cells. The apparatus may include means for selecting, from the one or more candidate cells, a target cell based at least in part on the full-duplexing capability information associated with the one or more candidate cells.

Some aspects described herein relate to a base station for wireless communication. The base station may include a memory and one or more processors coupled to the memory. The one or more processors may be configured to determine full-duplexing capability information associated with one or more candidate cells. The one or more processors may be configured to transmit signaling that indicates the full-duplexing capability information associated with the one or more candidate cells.

Some aspects described herein relate to a method of wireless communication performed by a base station. The method may include determining full-duplexing capability information associated with one or more candidate cells. The method may include transmitting signaling that indicates the full-duplexing capability information associated with the one or more candidate cells.

Some aspects described herein relate to a non-transitory computer-readable medium that stores a set of instructions for wireless communication by a base station. The set of instructions, when executed by one or more processors of the base station, may cause the base station to determine full-duplexing capability information associated with one or more candidate cells. The set of instructions, when executed by one or more processors of the base station, may cause the base station to transmit signaling that indicates the full-duplexing capability information associated with the one or more candidate cells.

Some aspects described herein relate to an apparatus for wireless communication. The apparatus may include means for determining full-duplexing capability information associated with one or more candidate cells. The apparatus may include means for transmitting signaling that indicates the full-duplexing capability information associated with the one or more candidate cells.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
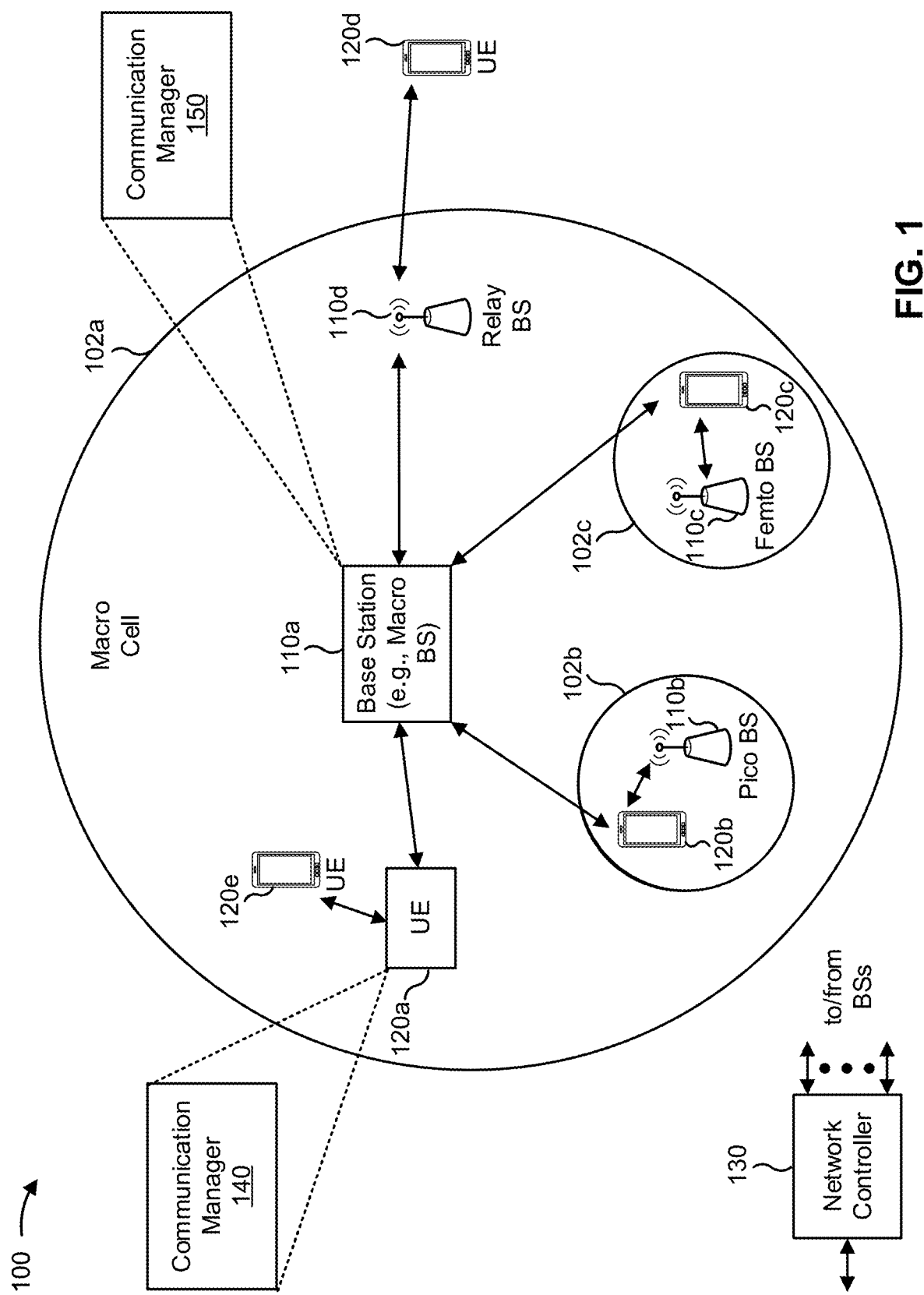
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may receive signaling that indicates full-duplexing capability information associated with one or more candidate cells; and select, from the one or more candidate cells, a target cell based at least in part on the full-duplexing capability information associated with the one or more candidate cells. Additionally, or alternatively, the communication manager 140 may perform one or more other operations described herein.

In some aspects, the base station 110 may include a communication manager 150. As described in more detail elsewhere herein, the communication manager 150 may determine full-duplexing capability information associated with one or more candidate cells; and transmit signaling that indicates the full-duplexing capability information associated with the one or more candidate cells. Additionally, or alternatively, the communication manager 150 may perform one or more other operations described herein.

As indicated above, FIG. 1 is provided as an example. Other examples may differ from what is described with regard to FIG. 1.

Figure 2:
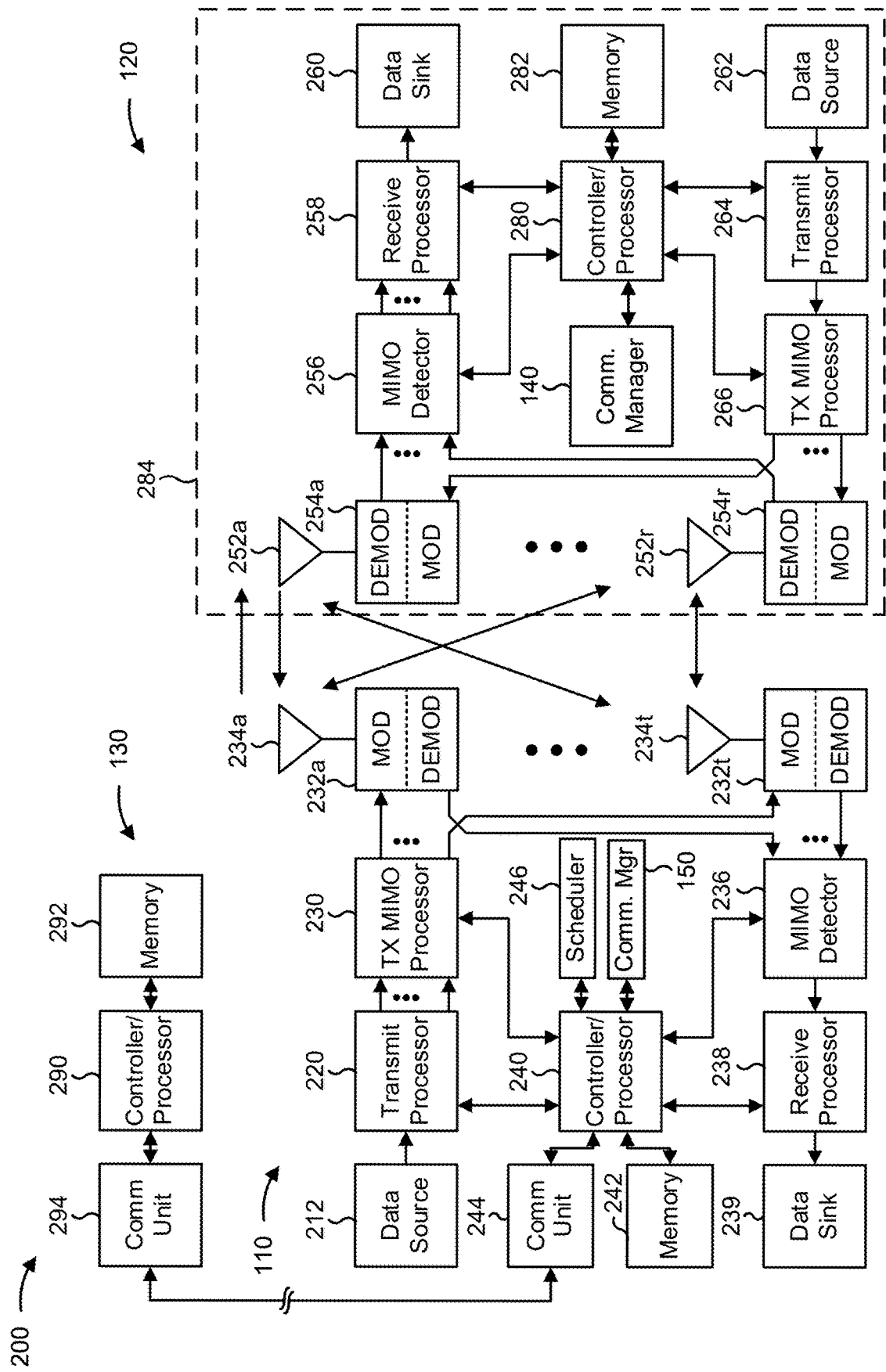
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 6-10).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 6-10).

The controller/processor 240 of the base station 110, the controller/processor 280 of the UE 120, and/or any other component(s) of FIG. 2 may perform one or more techniques associated with a full-duplex capability indication that may be used for cell selection, as described in more detail elsewhere herein. For example, the controller/processor 240 of the base station 110, the controller/processor 280 of the UE 120, and/or any other component(s) of FIG. 2 may perform or direct operations of, for example, process 700 of FIG. 7, process 800 of FIG. 8, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 700 of FIG. 7, process 800 of FIG. 8, and/or other processes as described herein. In some examples, executing instructions may include running the instructions, converting the instructions, compiling the instructions, and/or interpreting the instructions, among other examples.

In some aspects, the UE 120 includes means for receiving signaling that indicates full-duplexing capability information associated with one or more candidate cells; and/or means for selecting, from the one or more candidate cells, a target cell based at least in part on the full-duplexing capability information associated with the one or more candidate cells. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the base station 110 includes means for determining full-duplexing capability information associated with one or more candidate cells; and/or means for transmitting signaling that indicates the full-duplexing capability information associated with the one or more candidate cells. The means for the base station 110 to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
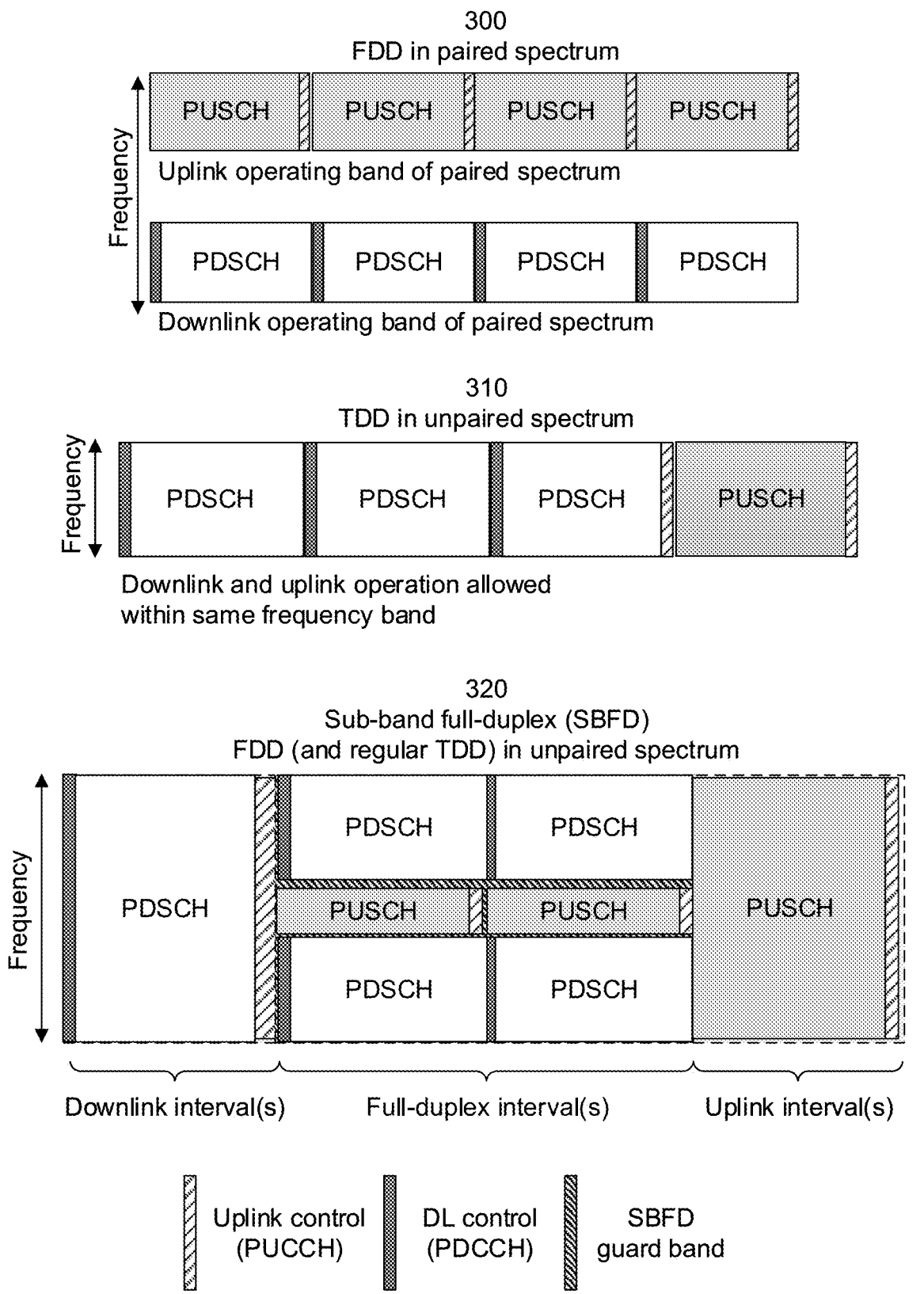
FIG. 3 is a diagram illustrating examples of different duplexing modes, in accordance with the present disclosure.

FIG. 3 is a diagram illustrating examples 300, 310, 320 of different duplexing modes, in accordance with the present disclosure. For example, as described in further detail herein, FIG. 3 illustrates an example 300 of a frequency division duplexing (FDD) mode that may be used in paired spectrum, an example 310 of a time division duplexing (TDD) mode that may be used in unpaired spectrum, and an example 320 of a sub-band full-duplexing (SBFD) mode that may be used in unpaired spectrum.

In some aspects, a wireless communication standard and/or governing body may generally specify one or more duplexing modes in which a wireless spectrum is to be used. For example, 3GPP may specify how wireless spectrum is to be used for the 5G/NR radio access technology and interface. As an example, a specification may indicate whether a band is to be used as paired spectrum in an FDD mode or as unpaired spectrum in a TDD mode.

For example, as shown by example 300, paired spectrum in the FDD mode may use a first frequency region (or channel) for uplink communication and a second frequency region (or channel) for downlink communication. In such cases, the frequency regions or channels used for uplink communication and downlink communication do not overlap, have different center frequencies, and have sufficient separation to prevent interference between the downlink communication and the uplink communication. For example, paired spectrum in FDD mode may include an uplink operating band and a downlink operating band that are configured to use non-overlapped frequency regions separated by a guard band. Accordingly, when operating in the FDD mode in paired spectrum, a UE with full-duplex capabilities may perform concurrent transmit and receive operations using the separate operating bands allocated to downlink and uplink communication. For example, paired bands in NR include NR operating bands n1, n2, n3, n5, n7, n8, n12, n20, n25, and n28, as specified by 3GPP Technical Specification (TS) 38.101-1.

Alternatively, as shown by example 310, unpaired spectrum in the TDD mode may allow downlink and uplink operation within a single frequency region (e.g., a single operating band). For example, when operating in TDD mode in unpaired spectrum, downlink communication and uplink communication may occur in the same frequency range. Some deployments may use TDD in the unpaired band, whereby some transmission time intervals (e.g., frames, slots, and/or symbols) are used for downlink communication only and other transmission time intervals are used for uplink communication only. In this case, substantially the entire bandwidth of a component carrier may be used for downlink communication or uplink communication, depending on whether the communication is performed in a downlink interval, an uplink interval, or a special interval (in which either downlink or uplink communication can be scheduled). Examples of unpaired bands include NR operating bands n40, n41, and n50, as specified by 3GPP TS 38.101-1. In some cases, however, using TDD in unpaired spectrum may be inefficient. For example, uplink transmit power may be limited, meaning that UEs may be incapable of transmitting with enough power to efficiently utilize the full bandwidth of an uplink slot. This may be particularly problematic in large cells at the cell edge. Furthermore, using TDD may introduce latency relative to a full-duplex scheme in which uplink communications and downlink communications can be performed in the same time interval, since TDD restricts usage of a given transmission time interval to uplink or downlink communication only. Furthermore, using TDD may reduce spectral efficiency and/or reduce throughput by restricting usage of a given transmission time interval to uplink or downlink communication only.

Accordingly, as shown by example 320, an unpaired band may be configured in a full-duplexing mode to enable concurrent transmit and receive operations in unpaired spectrum (e.g., a TDD band). For example, in FIG. 3, example 320 depicts a SBFD mode, which may be referred to herein as full-duplexing in a frequency division multiplexing (FDM) mode, in order to enable TDD operation and/or FDD operation in unpaired spectrum. For example, as shown in FIG. 3, an unpaired band configured in the SBFD mode may associate one or more transmission time intervals with downlink communication only, one or more transmission time intervals for uplink communication only, and one or more transmission time intervals for both downlink communication and uplink communication. Each transmission time interval may be associated with a control region, illustrated as a portion of a time interval with a diagonal fill for uplink control (e.g., a physical uplink control channel (PUCCH)) or a darker-shaded fill for downlink control (e.g., a physical downlink control channel (PDCCH)). Additionally, or alternatively, each time interval may be associated with a data region, which is shown as a physical downlink shared channel (PDSCH) for downlink frequency regions or a physical uplink shared channel (PUSCH) for uplink frequency regions.

In some aspects, an unpaired band configured in the SBFD mode may include one or more full-duplex time intervals (e.g., frames, subframes, slots, and/or symbols, among other examples) that are associated with an FDD configuration. For example, as shown in FIG. 3, the FDD configuration associated with a full-duplex time interval may indicate one or more downlink frequency regions (or sub-bands) and one or more uplink frequency regions (or sub-bands) that are separated by a guard band. Accordingly, an FDD configuration may divide an unpaired frequency band (e.g., one or more component carriers of an unpaired band) into uplink frequency regions, downlink frequency regions, and/or other regions (e.g., guard bands and/or the like), which may enable a UE with full-duplex capabilities to perform simultaneous transmit and receive operations during one or more time intervals that are divided into downlink and uplink sub-bands with a guard band separation to prevent the uplink transmission from causing self-interference with respect to downlink reception. In some aspects, the FDD configuration may identify bandwidth part (BWP) configurations corresponding to the uplink frequency regions and the downlink frequency regions. For example, a respective BWP may be configured for each uplink frequency region and each downlink frequency region.

Additionally, or alternatively, full-duplexing may be enabled in unpaired spectrum in an in-band full-duplexing (IBFD) mode, which may be referred to herein as full-duplexing in a spatial division multiplexing (SDM) mode. For example, in an IBFD or SDM mode, uplink communication may occur on time and frequency resources that fully overlap time and frequency resources allocated to downlink communication (e.g., all of the time and frequency resources available for uplink communication are also available for downlink communication), or time and frequency resources that partially overlap with time and frequency resources available for downlink communication (e.g., some time and frequency resources available for uplink communication are also available for downlink communication and some time and frequency resources available for uplink communication are uplink-only). In general, in the IBFD mode, full-duplex communication may be conditional on sufficient beam separation between an uplink beam and a downlink beam (e.g., uplink transmission may be from one antenna panel and downlink reception may be in another antenna panel) in order to minimize self-interference that may occur when a transmitted signal leaks into a receive port and/or when an object in a surrounding environment reflects a transmitted signal back to a receive port (e.g., causing a clutter echo effect)

As indicated above, FIG. 3 is provided as an example. Other examples may differ from what is described with regard to FIG. 3.

Figure 4:
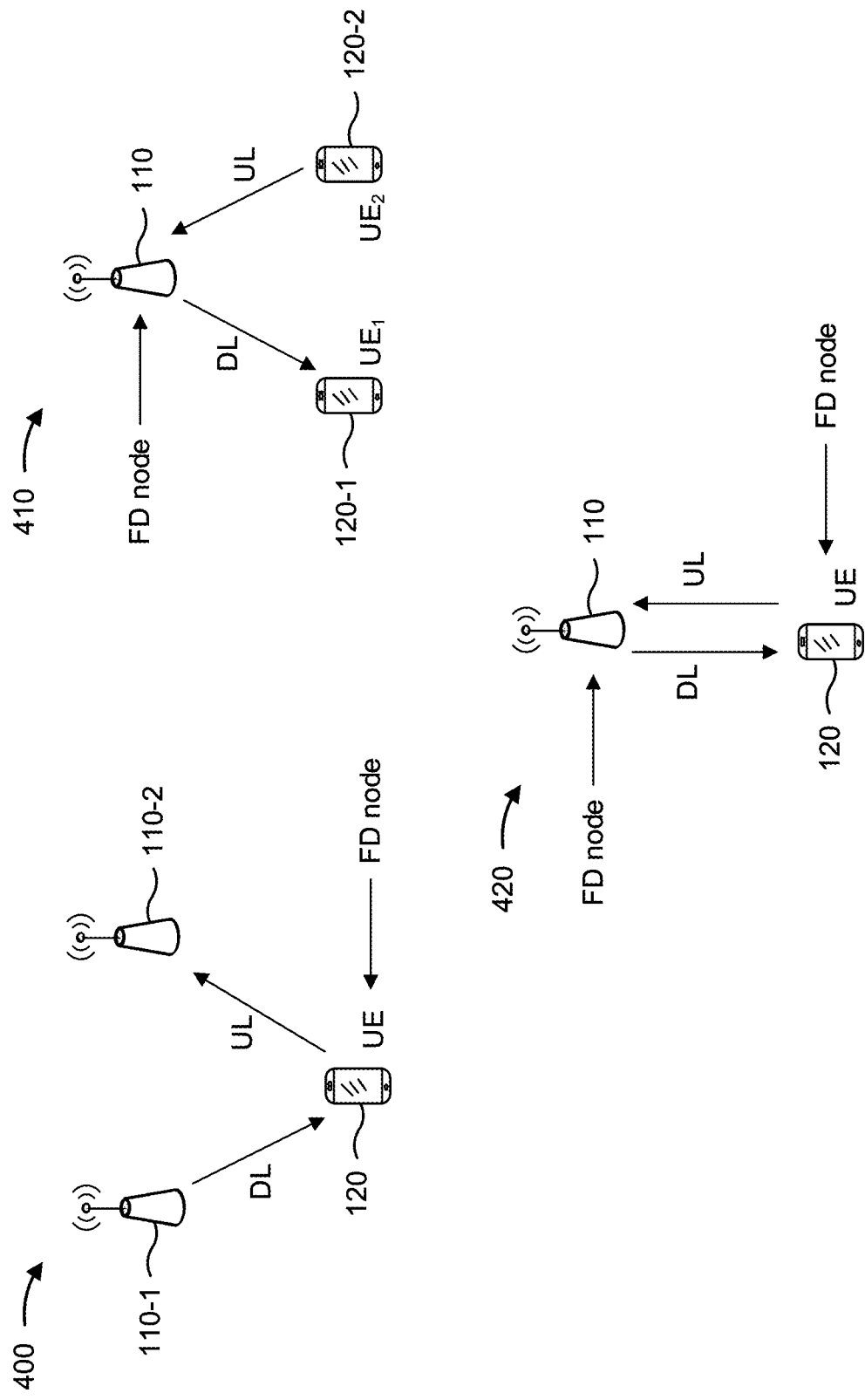
FIG. 4 is a diagram illustrating examples of full-duplex communication, in accordance with the present disclosure.

FIG. 4 is a diagram illustrating examples 400, 410, 420 of full-duplex communication, in accordance with the present disclosure. As shown in FIG. 4, examples 400, 410, 420 include one or more UEs 120 in communication with one or more base stations 110 and/or TRPs 110 in a wireless network that supports full-duplex communication. However, it will be appreciated that the devices shown in FIG. 4 are exemplary only, and that the wireless network may support full-duplex communication between other devices (e.g., between a UE 120 and a base station 110 or a TRP 110, between a mobile termination node and a control node, between an integrated access and backhaul (IAB) child node and an IAB parent node, and/or between a scheduled node and a scheduling node).

As shown in FIG. 4, example 400 includes a UE 120 in communication with two base stations (e.g., TRPs) 110-1, 110-2. As shown in FIG. 4, the UE 120 may transmit one or more uplink transmissions to base station 110-1 and may concurrently receive one or more downlink transmissions from base station 110-2. Accordingly, in example 400, full-duplex communication is enabled for the UE 120, which may be operating as a full-duplex node, but not for the base stations 110-1, 110-2, which may be operating as half-duplex nodes. Additionally, or alternatively, example 410 includes a first UE 120-1 and a second UE 120-2, in communication with a base station 110. In this case, the base station 110 may transmit one or more downlink transmissions to the first UE 120-1 and may concurrently receive one or more uplink transmissions from the second UE 120-2. Accordingly, in example 410, full-duplex communication is enabled for the base station 110, which may be operating as a full-duplex node, but not for the first UE 120-1 and the second UE 120-2, which are operating as half-duplex nodes. Additionally, or alternatively, example 420 includes a UE 120 in communication with a base station 110. In this case, the base station 110 may transmit, and the UE 120 may receive, one or more downlink transmissions concurrently with the UE 120 transmitting, and the base station 110 receiving, one or more uplink transmissions. Accordingly, in the example 420, full-duplex communication is enabled for both the UE 120 and the base station 110, each of which is operating as a full-duplex node.

The present disclosure generally relates to improving the manner in which flexible TDD operates to support full-duplex communication, which generally refers to simultaneous downlink and uplink transmissions in unpaired spectrum (e.g., in an SBFD or FDM mode, where uplink and downlink communication occur in separate frequency resources that are separated by a guard band, or in an IBFD or SDM mode, where uplink and downlink communication occur in frequency resources that fully or partially overlap). In some aspects, flexible TDD capabilities that support full-duplex communication may be present at a scheduling node (e.g., a base station, a TRP, a control node, and/or a parent node), a scheduled node (e.g., a UE, a mobile termination (MT) node, and/or a child node), or both. For example, at a full-duplexing node, uplink transmission may be from one antenna panel and downlink reception may be in another antenna panel. In general, full-duplex communication may be conditional on beam separation between an uplink beam and a downlink beam at the respective antenna panels in order to minimize self-interference that may occur when a transmitted signal leaks into a receive port and/or when an object in a surrounding environment reflects a transmitted signal back to a receive port (e.g., causing a clutter echo effect). Accordingly, improving the manner in which transmission parameters are determined or otherwise configured for the uplink and the downlink to enable full-duplex communication is desirable. Utilizing full-duplex communication may provide reduced latency by allowing a UE to receive a downlink signal in an uplink-only slot, or to transmit an uplink signal in a downlink-only slot. In addition, full-duplex communication may enhance spectral efficiency or throughput per cell or per UE and/or enable more efficient resource utilization by simultaneously utilizing time and frequency resources for downlink communication and uplink communication.

As indicated above, FIG. 4 is provided as an example. Other examples may differ from what is described with regard to FIG. 4.

Figure 5:
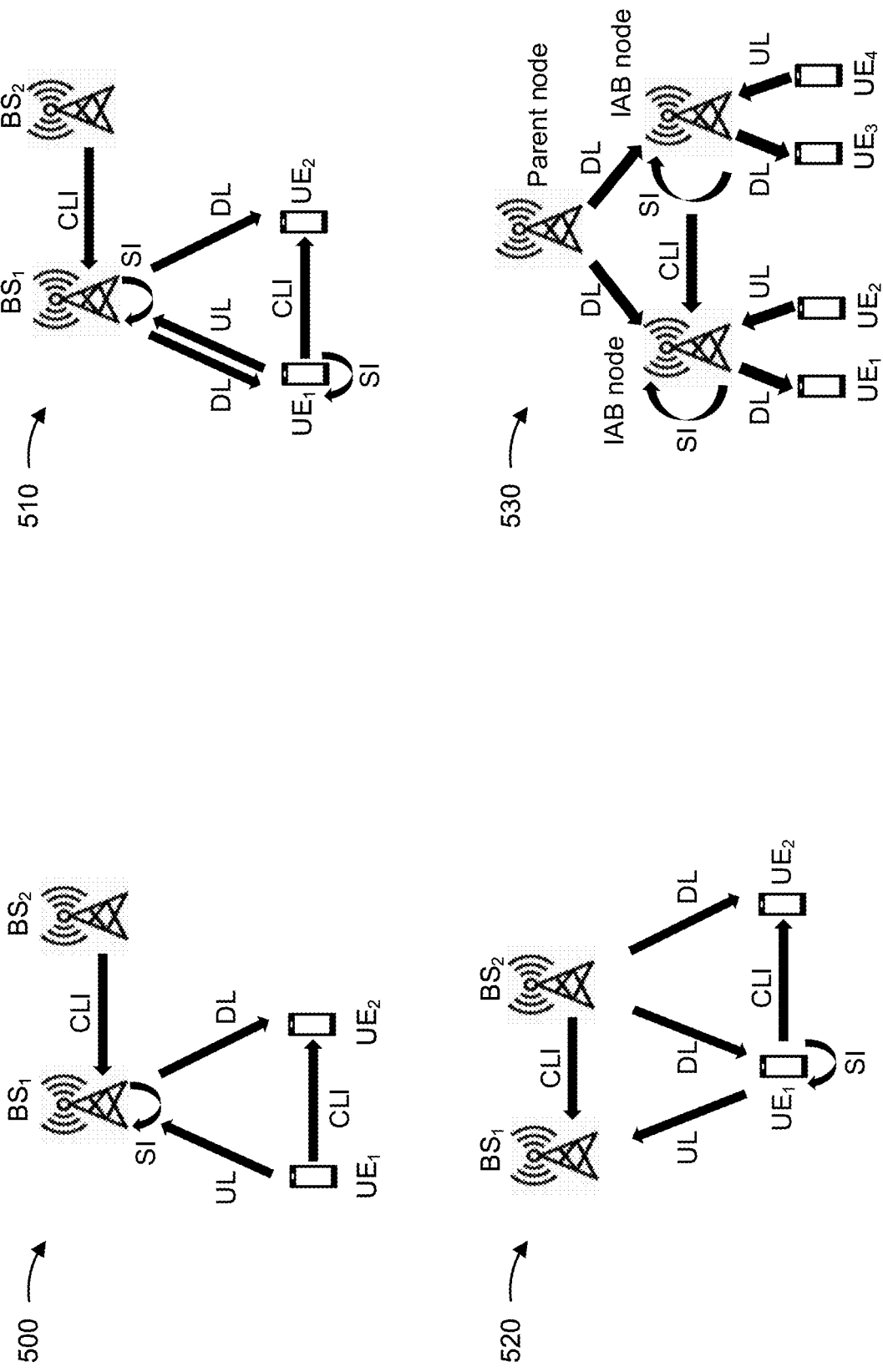
FIG. 5 is a diagram illustrating examples of full-duplex deployment scenarios, in accordance with the present disclosure.

FIG. 5 is a diagram illustrating examples 500, 510, 520, 530 of full-duplex deployment scenarios, in accordance with the present disclosure. As shown in FIG. 5, examples 500, 510, 520, 530 include one or more UEs in communication with one or more base stations in a wireless network that supports full-duplex communication. In general, as described herein, utilizing a full-duplexing communication mode may provide reduced latency by allowing a downlink transmission to occur in an uplink-only slot and/or by allowing an uplink transmission to occur in a downlink-only slot. In addition, full-duplex communication may enhance spectral efficiency or throughput per cell or per UE and/or enable more efficient resource utilization by simultaneously utilizing time and frequency resources for downlink and uplink communication. However, as described in further detail herein, full-duplexing communication modes may be associated with dynamic interference conditions.

For example, as shown in FIG. 5, example 500 includes a first UE (shown as $UE_1$) and a second UE (shown as $UE_2$) in communication with a first base station (shown as $BS_1$) operating in a full-duplexing mode. For example, as shown in FIG. 5, the first UE may transmit one or more uplink transmissions to the first base station, and the second UE may concurrently receive one or more downlink transmissions from the first base station. Accordingly, in example 500, the first base station is operating in a full-duplexing mode, and the first UE and the second UE are each operating in a half-duplexing node. As shown by example 600, there may be various forms of interference that may degrade downlink reception performance at one or more UEs and/or uplink reception performance at the first base station operating in the full-duplexing mode. For example, as shown, the first base station may experience cross-link interference (CLI) caused by downlink transmissions from a second base station (shown as $BS_2$) that may be located in an adjacent or nearby cell. Furthermore, as shown, the uplink transmission from the first UE to the first base station may cause CLI at the second UE (e.g., CLI that interferes with downlink reception at the second UE). Furthermore, as shown, the first base station may experience self-interference, where the downlink transmission to the second UE interferes with reception of the uplink transmission from the first UE. For example, as described herein, self-interference may generally occur when a transmitted signal leaks into a receive port and/or when an object in a surrounding environment reflects a transmitted signal back to a receive port (e.g., causing a clutter echo effect).

As further shown in FIG. 5, in example 510, a first UE may communicate with a first base station in a full-duplexing mode. For example, in example 510, the first UE may receive one or more downlink transmissions from the first base station, and the first UE may concurrently transmit one or more uplink transmissions to the first base station. Accordingly, in example 510, the first base station and the first UE are both operating in a full-duplexing mode. Furthermore, as shown, the first base station may be communicating with a second UE operating in a half-duplex mode. As shown in FIG. 5, the first UE may experience self-interference, where the uplink transmission to the first base station interferes with reception of the downlink transmission from the first base station, and the first UE may cause cross-link interference at the second UE, where the uplink transmission to the first base station interferes with downlink reception at the second UE. Additionally, in example 510, the first base station may experience CLI caused by one or more downlink transmissions from a second base station interfering with reception of the uplink transmission from the first UE, and the first base station may experience self-interference, where downlink transmission(s) to the first UE and/or the second UE interferes with reception of the uplink transmission from the first UE.

As further shown in FIG. 5, in example 520, a first UE may communicate with a first base station and a second base station in a full-duplexing mode (e.g., a multi-TRP mode). For example, in example 520, the first UE may transmit one or more uplink transmissions to the first base station, and the first UE may concurrently receive one or more downlink transmissions from the second base station. Accordingly, in example 520, the first UE is operating in a full-duplexing mode, and the first and second base stations are both operating in a half-duplexing mode. As shown in FIG. 5, the first UE may experience self-interference, where the uplink transmission to the first base station interferes with reception of the downlink transmission from the second base station. Furthermore, the uplink transmission by the first UE may cause CLI at a second UE that is receiving a downlink transmission from the second base station. Furthermore, as shown, the downlink transmission by the second base station may cause CLI interfering with reception of the uplink transmission from the first UE at the first base station.

As further shown in FIG. 5, in example 530, full-duplexing may be enabled at one or more IAB nodes. For example, as shown, one or more IAB nodes operating in a full-duplexing mode may receive downlink transmissions from a parent node, and the one or more IAB nodes may concurrently communicate with one or more UEs on a downlink and an uplink. For example, as shown, a first IAB node may perform a downlink transmission to a first UE and concurrently receive an uplink transmission from a second UE, and a second IAB node may perform a downlink transmission to a third UE and concurrently receive an uplink transmission from a fourth UE. Accordingly, in example 530, the IAB nodes under the parent node are operating in a full-duplexing mode (e.g., in an SBFD or FDM mode, or in an IBFD or SDM mode, with a resource block group (RBG) granularity), and the various UEs are each operating in a half-duplexing mode. As shown by example 530, the first IAB node and the second IAB node may both experience self-interference, where the downlink transmissions by the respective IAB nodes interfere with reception of the uplink transmissions from the served UEs and/or downlink transmissions from the parent node. Furthermore, the downlink transmissions by each IAB node may cause CLI at the other IAB node.

In a wireless network, a UE may perform a cell selection procedure or a cell reselection procedure in order to identify a suitable cell on which to camp. For example, in some aspects, the UE may perform a cell selection procedure to select a cell that satisfies one or more cell selection criteria to enable initial network access and/or may perform a cell reselection procedure in a connected mode to enable a conditional handover and/or in an idle mode to connect to a neighbor cell that may offer better performance than a current serving cell. When performing the cell selection or cell reselection procedure, which may be referred to interchangeably herein, the cell selection criteria used by the UE may generally depend on one or more downlink measurements. For example, the UE may obtain an RSRP measurement, an RSRQ measurement, a signal-to-interference-plus-noise ratio (SINR) measurement, and/or other suitable measurements for one or more downlink signals, and the UE may use the one or more downlink measurements to select a suitable cell.

However, in some cases, one or more candidate cells that are detected by a UE may have different duplexing capabilities, which are not reflected in the downlink signal measurements. For example, the UE may prefer to select a candidate cell that offers full-duplexing capabilities to reduce uplink and/or downlink latency, or the UE may prefer to select a candidate cell that offers half-duplexing capabilities to avoid CLI. However, the UE may generally lack any knowledge related to whether a candidate cell is a full-duplex cell or a half-duplex cell. Accordingly, when the UE is attempting to gain initial network access or determine whether a neighbor cell offers better conditions than the serving cell, the UE may be unable to identify and/or exploit the specific duplexing capabilities of the various candidate cells. Some aspects described herein therefore relate to techniques and apparatuses whereby a base station that provides a cell may transmit signaling that indicates full-duplexing capability information associated with the cell provided by the base station. For example, in some aspects, the full-duplexing capability information may indicate whether the cell is a full-duplex cell or a half-duplex cell, and in cases where the cell is a half-duplex cell, the full-duplexing capability information may further indicate a full-duplexing mode supported by the cell and/or information related to one or more key performance indicators (KPIs). In this way, the UE may take the full-duplexing capability information signaled by various base stations (referred to herein interchangeably as candidate cells) into consideration when selecting a suitable or optimal cell in a cell selection or cell reselection procedure.

As indicated above, FIG. 5 is provided as an example. Other examples may differ from what is described with regard to FIG. 5.

Figure 6:
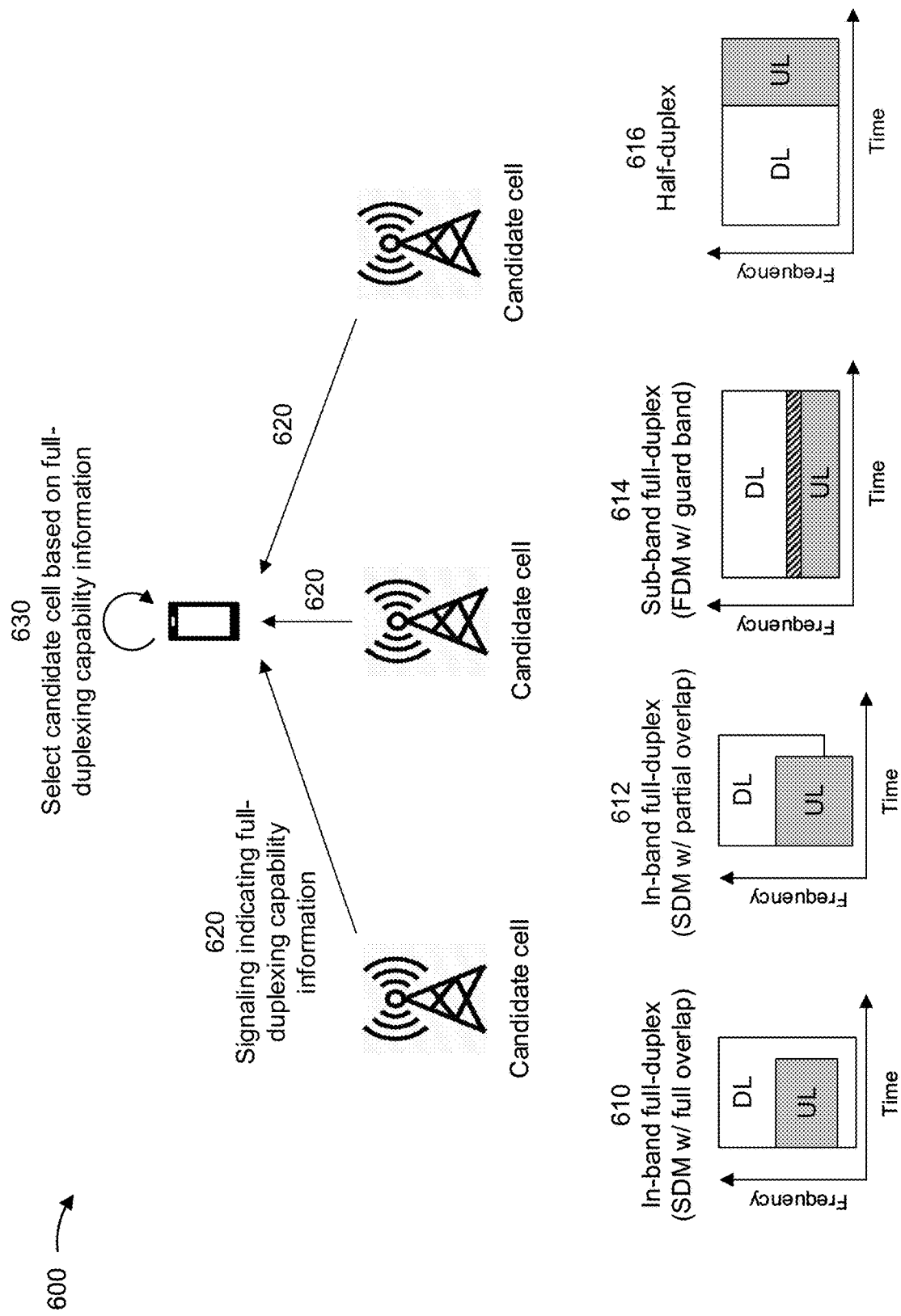
FIG. 6 is a diagram illustrating an example associated with a full-duplex capability indication that may be used for cell selection, in accordance with the present disclosure.

FIG. 6 is a diagram illustrating an example associated with a full-duplex capability indication that may be used for cell selection, in accordance with the present disclosure. As shown in FIG. 6, a UE (e.g., UE 120) may perform a cell selection or cell reselection procedure to select a suitable candidate cell (e.g., a base station 110 or TRP) with which to communicate in a wireless network (e.g., wireless network 100). In some aspects, each candidate cell may support communicating in a full-duplexing mode and/or a half-duplexing mode, and the duplexing capabilities of the various candidate cells may be included among one or more cell selection criteria that the UE considers to identify a suitable candidate cell to select or reselect.

For example, as shown by reference number 610, one or more candidate cells may support full-duplex communication in an IBFD mode (which may be referred to interchangeably herein as an SDM mode), where uplink communication occurs on time and frequency resources that fully overlap time and frequency resources allocated to downlink communication (e.g., all of the time and frequency resources available for uplink communication are also available for downlink communication). Additionally, or alternatively, as shown by reference number 612, one or more candidate cells may support full-duplex communication in an IBFD or SDM mode where time and frequency resources available for uplink communication partially overlap with time and frequency resources available for downlink communication (e.g., some time and frequency resources available for uplink communication are also available for downlink communication and some time and frequency resources available for uplink communication are uplink-only). Additionally, or alternatively, as shown by reference number 614, one or more candidate cells may support full-duplex communication in an SBFD mode (which may be referred to interchangeably herein as an FDM mode), where simultaneous transmission and reception occurs in different frequency resources, which include separate downlink and uplink frequency resources that are separated by a guard band on the same carrier. Additionally, or alternatively, as shown by reference number 616, one or more candidate cells may be half-duplex cells, where communication in each transmission time interval is downlink-only or uplink-only.

As shown in FIG. 6, and by reference number 620, base stations associated with the one or more candidate cells may transmit signaling that indicates full-duplexing capability information for the corresponding candidate cell. For example, in some aspects, the signaling that indicates the full-duplexing capability may be broadcasted by each base station (e.g., in remaining minimum system information (RMSI) or in one or more radio resource control (RRC) messages per candidate cell that is configured for the UE). In some aspects, the full-duplexing capability information signaled by each base station may generally indicate whether the candidate cell supports a full-duplexing mode. For example, the full-duplexing capability information may indicate whether the candidate cell provided by the base station is a full-duplex cell or a half-duplex cell. Furthermore, in cases where the candidate cell is a full-duplex cell, the full-duplexing capability information may indicate whether the candidate cell supports full-duplexing in an FDM mode (e.g., an SBFD mode, as shown by reference number 614 in FIG. 6 and by example 320 in FIG. 3) or an SDM mode (e.g., an SBFD mode, as shown by reference numbers 610 and 612 in FIG. 6 and described above with reference to FIG. 3).

In some aspects, in cases where the full-duplexing capability information indicates one or more full-duplexing modes supported by the candidate cell, the full-duplexing capability information may further indicate one or more parameters related to the supported full-duplexing mode(s). For example, in a candidate cell that supports full-duplexing in the FDM mode, the full-duplexing capability information signaled by the corresponding base station may indicate a value related to a minimum size of the guard band that is used to separate an uplink resource allocation from a downlink resource allocation (e.g., a number of resource blocks (RBs) that are needed between the uplink sub-band and the downlink sub-band to avoid uplink-to-downlink leakage and thereby support full-duplexing in the candidate cell). In some aspects, each base station that provides a candidate cell may measure the minimum size of the guard band according to a worst downlink and uplink beam pair that supports full-duplexing in the FDM mode (e.g., the base station may sweep through each downlink and uplink beam pair that supports full-duplexing in the FDM mode, and the minimum size of the guard band may be measured based on the downlink and uplink beam pair that causes the most self-interference). Accordingly, by measuring the minimum size of the guard band according to the worst downlink and uplink beam pair that supports full-duplexing in the FDM mode, providing the guard band between a downlink frequency allocation (e.g., a downlink bandwidth part) and an uplink downlink frequency allocation (e.g., an uplink bandwidth part) may ensure that simultaneous transmission and reception will not cause intolerable self-interference. Furthermore, the guard band may mitigate CLI between different UEs that are communicating with a full-duplexing cell (e.g., where an uplink transmission by a first UE causes CLI that interferes with downlink reception at a second UE). In this way, by configuring the guard band to mitigate CLI, there may be no need for UEs to measure and report CLI, and the base station can safely perform simultaneous downlink transmission and uplink transmission even in cases where one or more served UEs are legacy UEs that do not support CLI measurements.

Additionally, or alternatively, the full-duplexing capability information may indicate information related to one or more KPIs. For example, a KPI generally refers to a quantifiable measure that relates to performance over time for one or more objectives. Accordingly, in context with the full-duplexing capability information, the information related to the one or more KPIs may provide measurable values that represent the full-duplexing performance and/or half-duplexing performance in a particular candidate cell over time (e.g., depending on whether the candidate cell is a full-duplex cell or a half-duplex cell). For example, in some aspects, the information related to the one or more KPIs may include statistics related to a downlink throughput, an uplink throughput, a downlink packet delivery latency, an uplink packet delivery latency, an end-to-end latency, a scheduling request (SR) completion latency, a random access channel (RACH) completion latency, a spectral efficiency, and/or reliability metrics (e.g., an average block error rate (BLER)), among other examples.

Accordingly, as shown by reference number 630, the UE may select a suitable candidate cell based at least in part on the full-duplexing capability information signaled by each candidate cell. For example, in some aspects, the UE may select the suitable candidate cell during a cell selection procedure to acquire initial network access or during a cell reselection procedure associated with a conditional handover or idle mode operations. In some aspects, the UE may include the full-duplexing capability information signaled by each candidate cell among one or more cell selection (or cell reselection) criteria. For example, in some aspects, the UE may select the suitable candidate cell based on only the full-duplexing capability information signaled by each candidate cell, or the UE may select the suitable cell based on the full-duplexing capability information signaled by each candidate cell in combination with downlink RSRP, RSRQ, SINR, and/or other suitable measurements and/or other parameters (e.g., public land mobile network (PLMN) and/or service type criteria). In this way, the UE may use the full-duplexing capability information signaled by one or more candidate cells to improve cell selection or cell reselection by determining whether to connect to a half-duplex or full-duplex candidate cell and/or selecting a particular half-duplex or a full-duplex candidate cell (e.g., because different half-duplex and/or full-duplex candidate cells may vary in terms of whether full-duplexing is supported or not supported, whether full-duplexing is supported in an FDM mode or SDM mode, the size of the guard band for full-duplexing in the FDM mode, and/or the KPI values that indicate the half-duplexing and/or full-duplexing performance of the candidate cell).

As indicated above, FIG. 6 is provided as an example. Other examples may differ from what is described with regard to FIG. 6.

Figure 7:
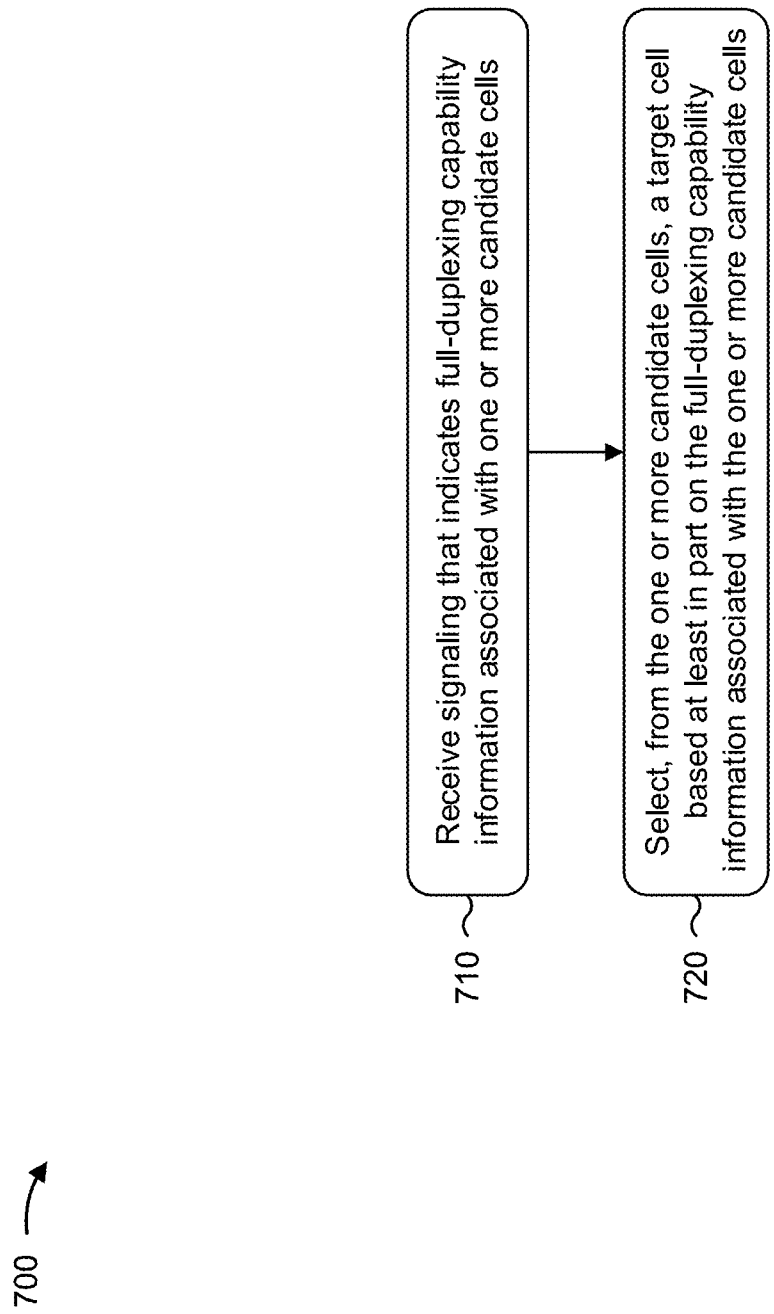
FIGS. 7-8 are diagrams illustrating example processes associated with a full-duplex capability indication that may be used for cell selection, in accordance with the present disclosure.

FIG. 7 is a diagram illustrating an example process 700 performed, for example, by a UE, in accordance with the present disclosure. Example process 700 is an example where the UE (e.g., UE 120) performs operations associated with full-duplex capability indication for cell selection.

As shown in FIG. 7, in some aspects, process 700 may include receiving signaling that indicates full-duplexing capability information associated with one or more candidate cells (block 710). For example, the UE (e.g., using communication manager 140 and/or reception component 902, depicted in FIG. 9) may receive signaling that indicates full-duplexing capability information associated with one or more candidate cells, as described above.

As further shown in FIG. 7, in some aspects, process 700 may include selecting, from the one or more candidate cells, a target cell based at least in part on the full-duplexing capability information associated with the one or more candidate cells (block 720). For example, the UE (e.g., using communication manager 140 and/or cell selection component 908, depicted in FIG. 9) may select, from the one or more candidate cells, a target cell based at least in part on the full-duplexing capability information associated with the one or more candidate cells, as described above.

Process 700 may include additional aspects, such as any single aspect or any combination of aspects described below and/or in connection with one or more other processes described elsewhere herein.

In a first aspect, the signaling includes RMSI or one or more RRC messages.

In a second aspect, alone or in combination with the first aspect, the full-duplexing capability information indicates whether each of the one or more candidate cells are a full-duplex cell or a half-duplex cell.

In a third aspect, alone or in combination with one or more of the first and second aspects, the full-duplexing capability information indicates, for a candidate cell that supports full-duplexing, whether the candidate cell supports full-duplexing in an FDM mode or an SDM mode.

In a fourth aspect, alone or in combination with one or more of the first through third aspects, the full-duplexing capability information indicates, for a candidate cell that supports full-duplexing in an FDM mode, information associated with a guard band between a downlink frequency allocation and an uplink frequency allocation.

In a fifth aspect, alone or in combination with one or more of the first through fourth aspects, the guard band has a size that is based at least in part on a worst downlink and uplink beam pair that supports full-duplexing in the FDM mode in the candidate cell.

In a sixth aspect, alone or in combination with one or more of the first through fifth aspects, the full-duplexing capability information indicates, for a candidate cell that supports full-duplexing, information related to one or more KPIs.

In a seventh aspect, alone or in combination with one or more of the first through sixth aspects, the information related to the one or more KPIs includes statistics related to a downlink and uplink throughput, a packet delivery latency, an SR completion latency, or a RACH completion latency.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
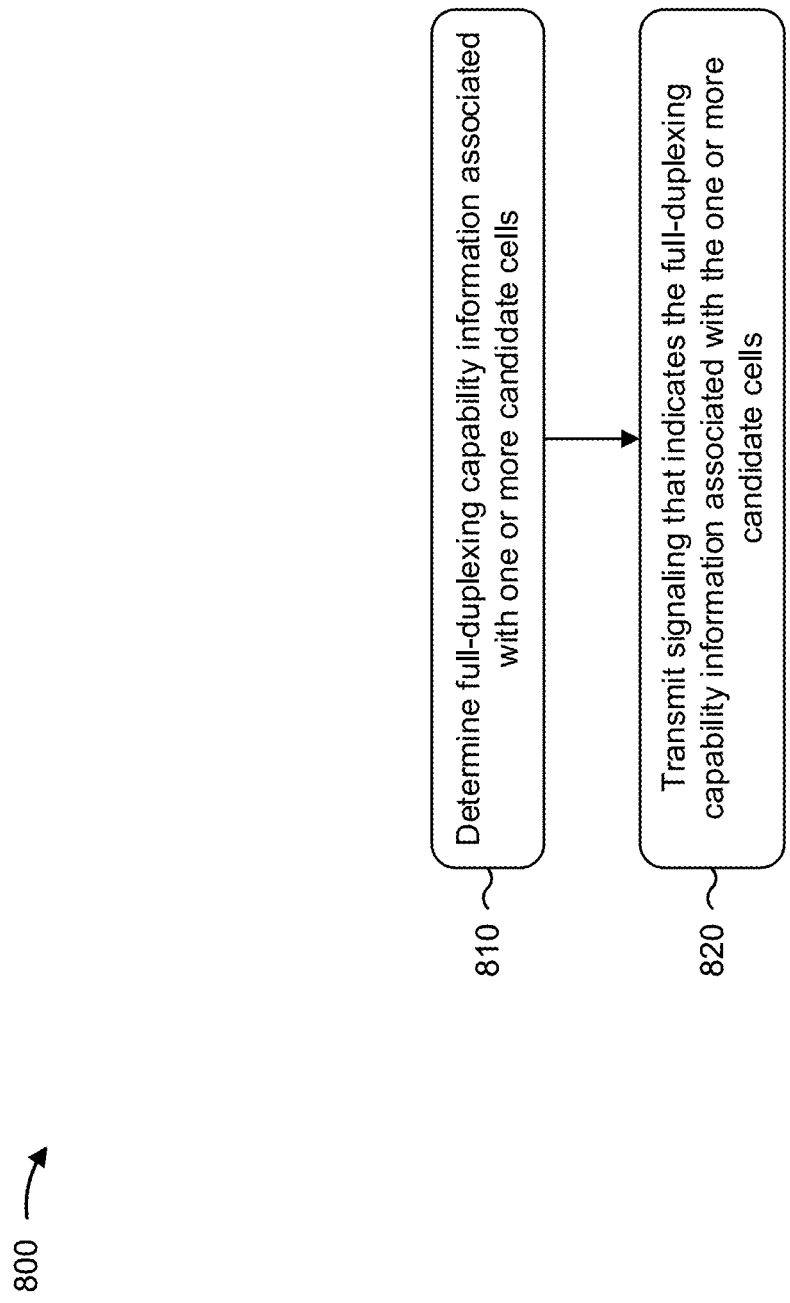

FIG. 8 is a diagram illustrating an example process 800 performed, for example, by a base station, in accordance with the present disclosure. Example process 800 is an example where the base station (e.g., base station 110) performs operations associated with full-duplex capability indication for cell selection.

As shown in FIG. 8, in some aspects, process 800 may include determining full-duplexing capability information associated with one or more candidate cells (block 810). For example, the base station (e.g., using communication manager 150 and/or determination component 1008, depicted in FIG. 10) may determine full-duplexing capability information associated with one or more candidate cells, as described above.

As further shown in FIG. 8, in some aspects, process 800 may include transmitting signaling that indicates the full-duplexing capability information associated with the one or more candidate cells (block 820). For example, the base station (e.g., using communication manager 150 and/or transmission component 1004, depicted in FIG. 10) may transmit signaling that indicates the full-duplexing capability information associated with the one or more candidate cells, as described above.

Process 800 may include additional aspects, such as any single aspect or any combination of aspects described below and/or in connection with one or more other processes described elsewhere herein.

In a first aspect, the signaling includes RMSI or one or more RRC messages.

In a second aspect, alone or in combination with the first aspect, the full-duplexing capability information indicates whether each of the one or more candidate cells are a full-duplex cell or a half-duplex cell.

In a third aspect, alone or in combination with one or more of the first and second aspects, the full-duplexing capability information indicates, for a candidate cell that supports full-duplexing, whether the candidate cell supports full-duplexing in an SDM mode or an SDM mode.

In a fourth aspect, alone or in combination with one or more of the first through third aspects, the full-duplexing capability information indicates, for a candidate cell that supports full-duplexing in an FDM mode, information associated with a guard band between a downlink frequency allocation and an uplink frequency allocation.

In a fifth aspect, alone or in combination with one or more of the first through fourth aspects, the guard band has a size that is based at least in part on a worst downlink and uplink beam pair that supports full-duplexing in the FDM mode in the candidate cell.

In a sixth aspect, alone or in combination with one or more of the first through fifth aspects, the full-duplexing capability information indicates, for a candidate cell that supports full-duplexing, information related to one or more KPIs.

In a seventh aspect, alone or in combination with one or more of the first through sixth aspects, the information related to the one or more KPIs includes statistics related to a downlink and uplink throughput, a packet delivery latency, an SR completion latency, or a RACH completion latency.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
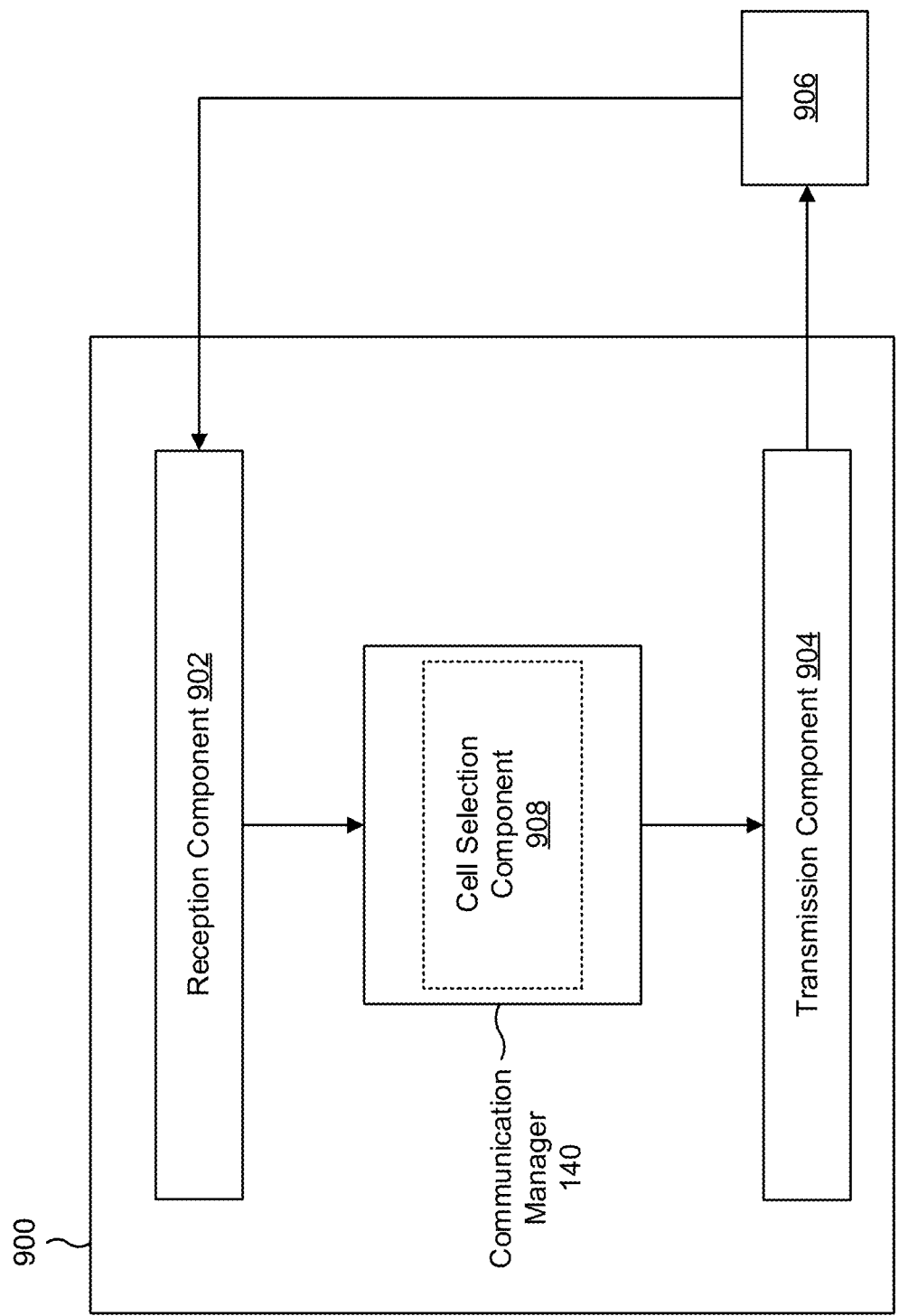
FIGS. 9-10 are diagrams of example apparatuses for wireless communication, in accordance with the present disclosure.

FIG. 9 is a diagram of an example apparatus 900 for wireless communication. The apparatus 900 may be a UE, or a UE may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a base station, or another wireless communication device) using the reception component 902 and the transmission component 904. As further shown, the apparatus 900 may include the communication manager 140. The communication manager 140 may include a cell selection component 908, among other examples.

In some aspects, the apparatus 900 may be configured to perform one or more operations described herein in connection with FIG. 6. Additionally, or alternatively, the apparatus 900 may be configured to perform one or more processes described herein, such as process 700 of FIG. 7. In some aspects, the apparatus 900 and/or one or more components shown in FIG. 9 may include one or more components of the UE described in connection with FIG. 2. Additionally, or alternatively, one or more components shown in FIG. 9 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 900. In some aspects, the reception component 902 may include one or more antennas, a modem, a demodulator, a MIMO detector, a receive processor, a controller/processor, a memory, or a combination thereof, of the UE described in connection with FIG. 2.

The transmission component 904 may transmit communications, such as reference signals, control information, data communications, or a combination thereof, to the apparatus 906. In some aspects, one or more other components of the apparatus 900 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modem, a modulator, a transmit MIMO processor, a transmit processor, a controller/processor, a memory, or a combination thereof, of the UE described in connection with FIG. 2. In some aspects, the transmission component 904 may be co-located with the reception component 902 in a transceiver.

The reception component 902 may receive signaling that indicates full-duplexing capability information associated with one or more candidate cells. The cell selection component 908 may select, from the one or more candidate cells, a target cell based at least in part on the full-duplexing capability information associated with the one or more candidate cells.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

Figure 10:
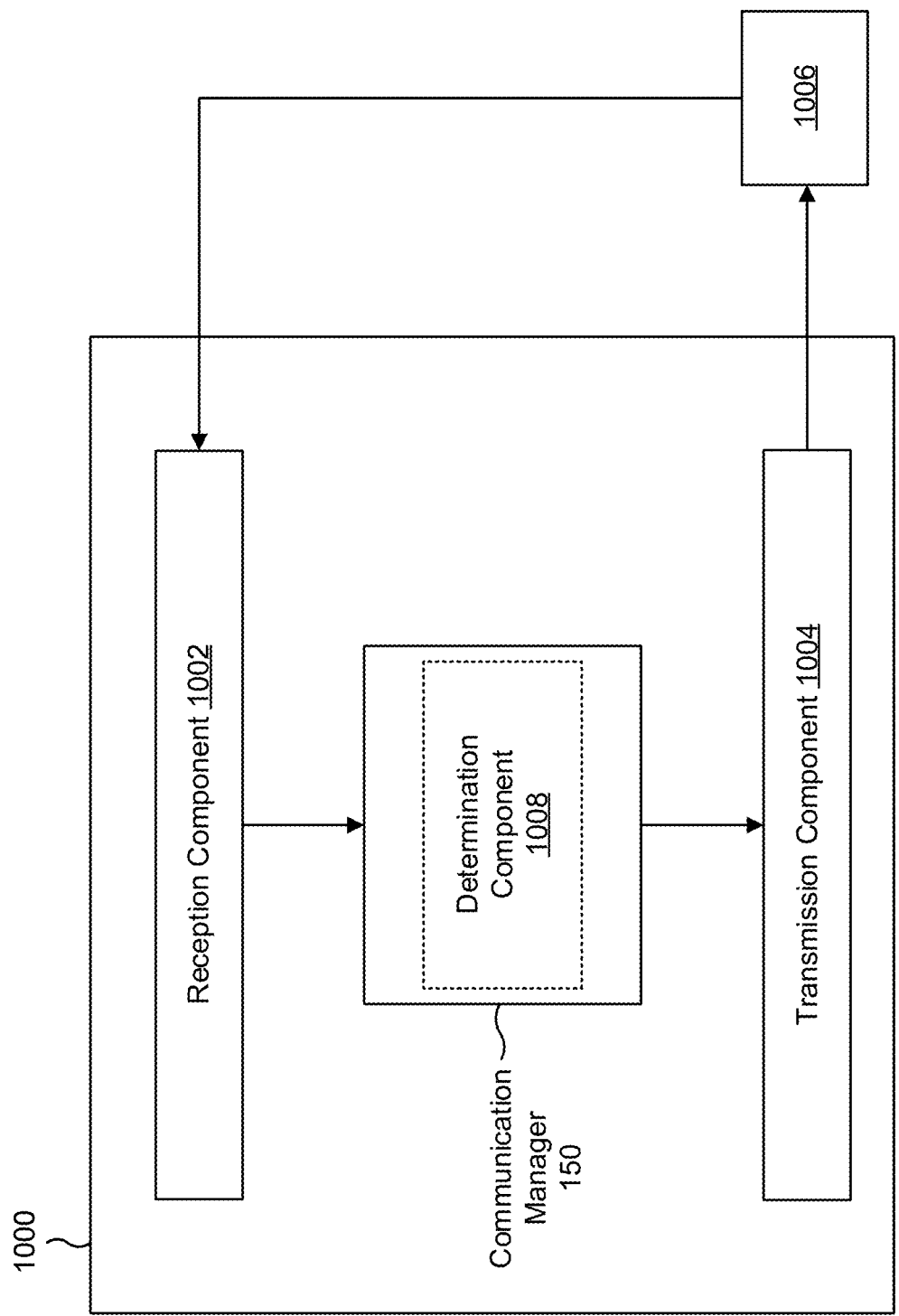

FIG. 10 is a diagram of an example apparatus 1000 for wireless communication. The apparatus 1000 may be a base station, or a base station may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, or another wireless communication device) using the reception component 1002 and the transmission component 1004. As further shown, the apparatus 1000 may include the communication manager 150. The communication manager 150 may include a determination component 1008, among other examples.

In some aspects, the apparatus 1000 may be configured to perform one or more operations described herein in connection with FIG. 6. Additionally, or alternatively, the apparatus 1000 may be configured to perform one or more processes described herein, such as process 800 of FIG. 8. In some aspects, the apparatus 1000 and/or one or more components shown in FIG. 10 may include one or more components of the base station described in connection with FIG. 2. Additionally, or alternatively, one or more components shown in FIG. 10 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1000. In some aspects, the reception component 1002 may include one or more antennas, a modem, a demodulator, a MIMO detector, a receive processor, a controller/processor, a memory, or a combination thereof, of the base station described in connection with FIG. 2.

The transmission component 1004 may transmit communications, such as reference signals, control information, data communications, or a combination thereof, to the apparatus 1006. In some aspects, one or more other components of the apparatus 1000 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modem, a modulator, a transmit MIMO processor, a transmit processor, a controller/processor, a memory, or a combination thereof, of the base station described in connection with FIG. 2. In some aspects, the transmission component 1004 may be co-located with the reception component 1002 in a transceiver.

The determination component 1008 may determine full-duplexing capability information associated with one or more candidate cells. The transmission component 1004 may transmit signaling that indicates the full-duplexing capability information associated with the one or more candidate cells.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

The following provides an overview of some Aspects of the present disclosure:

Aspect 1: A method of wireless communication performed by a UE, comprising: receiving signaling that indicates full-duplexing capability information associated with one or more candidate cells; and selecting, from the one or more candidate cells, a target cell based at least in part on the full-duplexing capability information associated with the one or more candidate cells.

Aspect 2: The method of Aspect 1, wherein the signaling includes RMSI or one or more RRC messages.

Aspect 3: The method of any of Aspects 1-2, wherein the full-duplexing capability information indicates whether each of the one or more candidate cells are a full-duplex cell or a half-duplex cell.

Aspect 4: The method of any of Aspects 1-3, wherein the full-duplexing capability information indicates, for a candidate cell that supports full-duplexing, whether the candidate cell supports full-duplexing in an FDM mode or an SDM mode.

Aspect 5: The method of any of Aspects 1-4, wherein the full-duplexing capability information indicates, for a candidate cell that supports full-duplexing in an FDM mode, information associated with a guard band between a downlink frequency allocation and an uplink frequency allocation.

Aspect 6: The method of Aspect 5, wherein the guard band has a size that is based at least in part on a worst downlink and uplink beam pair that supports full-duplexing in the FDM mode in the candidate cell.

Aspect 7: The method of any of Aspects 1-6, wherein the full-duplexing capability information indicates, for a candidate cell that supports full-duplexing, information related to one or more KPIs.

Aspect 8: The method of Aspect 7, wherein the information related to the one or more KPIs includes statistics related to a downlink and uplink throughput, a packet delivery latency, an SR completion latency, or a RACH completion latency.

Aspect 9: A method of wireless communication performed by a base station, comprising: determining full-duplexing capability information associated with one or more candidate cells; and transmitting signaling that indicates the full-duplexing capability information associated with the one or more candidate cells.

Aspect 10: The method of Aspect 9, wherein the signaling includes RMSI or one or more RRC messages.

Aspect 11: The method of any of Aspects 9-10, wherein the full-duplexing capability information indicates whether each of the one or more candidate cells are a full-duplex cell or a half-duplex cell.

Aspect 12: The method of any of Aspects 9-11, wherein the full-duplexing capability information indicates, for a candidate cell that supports full-duplexing, whether the candidate cell supports full-duplexing in an FDM mode or an SDM mode.

Aspect 13: The method of any of Aspects 9-12, wherein the full-duplexing capability information indicates, for a candidate cell that supports full-duplexing in an FDM mode, information associated with a guard band between a downlink frequency allocation and an uplink frequency allocation.

Aspect 14: The method of Aspect 13, wherein the guard band has a size that is based at least in part on a worst downlink and uplink beam pair that supports full-duplexing in the FDM mode in the candidate cell.

Aspect 15: The method of any of Aspects 9-14, wherein the full-duplexing capability information indicates, for a candidate cell that supports full-duplexing, information related to one or more KPIs.

Aspect 16: The method of Aspect 15, wherein the information related to the one or more KPIs includes statistics related to a downlink and uplink throughput, a packet delivery latency, an SR completion latency, or a RACH completion latency.

Aspect 17: An apparatus for wireless communication at a device, comprising a processor; memory coupled with the processor; and instructions stored in the memory and executable by the processor to cause the apparatus to perform the method of one or more of Aspects 1-8.

Aspect 18: A device for wireless communication, comprising a memory and one or more processors coupled to the memory, the one or more processors configured to perform the method of one or more of Aspects 1-8.

Aspect 19: An apparatus for wireless communication, comprising at least one means for performing the method of one or more of Aspects 1-8.

Aspect 20: A non-transitory computer-readable medium storing code for wireless communication, the code comprising instructions executable by a processor to perform the method of one or more of Aspects 1-8.

Aspect 21: A non-transitory computer-readable medium storing a set of instructions for wireless communication, the set of instructions comprising one or more instructions that, when executed by one or more processors of a device, cause the device to perform the method of one or more of Aspects 1-8.

Aspect 22: An apparatus for wireless communication at a device, comprising a processor; memory coupled with the processor; and instructions stored in the memory and executable by the processor to cause the apparatus to perform the method of one or more of Aspects 9-16.

Aspect 23: A device for wireless communication, comprising a memory and one or more processors coupled to the memory, the one or more processors configured to perform the method of one or more of Aspects 9-16.

Aspect 24: An apparatus for wireless communication, comprising at least one means for performing the method of one or more of Aspects 9-16.

Aspect 25: A non-transitory computer-readable medium storing code for wireless communication, the code comprising instructions executable by a processor to perform the method of one or more of Aspects 9-16.

Aspect 26: A non-transitory computer-readable medium storing a set of instructions for wireless communication, the set of instructions comprising one or more instructions that, when executed by one or more processors of a device, cause the device to perform the method of one or more of Aspects 9-16.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a user equipment (UE), comprising:
    receiving signaling that indicates full-duplexing capability information associated with a plurality of candidate cells, wherein the full-duplexing capability information indicates, for a candidate cell of the plurality of candidate cells that supports full-duplexing in a frequency division multiplexing (FDM) mode, information associated with a guard band between a downlink frequency allocation and an uplink frequency allocation, and wherein the guard band has a size that is based at least in part on a worst downlink and uplink beam pair that supports full-duplexing in the FDM mode in the candidate cell; and
    selecting, from the plurality of candidate cells, a target cell based at least in part on the full-duplexing capability information associated with the plurality of candidate cells.

2. The method of claim 1, wherein the signaling includes remaining minimum system information or one or more radio resource control messages.

3. The method of claim 1, wherein the full-duplexing capability information indicates whether each candidate cell of the plurality of candidate cells are a full-duplex cell or a half-duplex cell.

4. The method of claim 1, wherein the full-duplexing capability information indicates whether the candidate cell supports full-duplexing in a frequency division multiplexing mode or a spatial division multiplexing mode.

5. The method of claim 1, wherein the full-duplexing capability information indicates, for the candidate cell, information related to one or more key performance indicators (KPIs).

6. The method of claim 5, wherein the information related to the one or more KPIs includes statistics related to a downlink and uplink throughput, a packet delivery latency, a scheduling request completion latency, or a random access channel completion latency.

7. The method of claim 1, wherein the full-duplexing capability information indicates historical performance metrics of the candidate cell.

8. The method of claim 1, wherein the signaling includes timing information associated with the guard band size.

9. A method of wireless communication performed by a base station, comprising:
 determining full-duplexing capability information associated with a plurality of candidate cells, wherein the full-duplexing capability information indicates, for a candidate cell of the plurality of candidate cells that supports full-duplexing in a frequency division multiplexing (FDM) mode, information associated with a guard band between a downlink frequency allocation and an uplink frequency allocation, and wherein the guard band has a size that is based at least in part on a worst downlink and uplink beam pair that supports full-duplexing in the FDM mode in the candidate cell; and
 transmitting signaling that indicates the full-duplexing capability information associated with the plurality of candidate cells.

10. The method of claim 9, wherein the signaling includes remaining minimum system information or one or more radio resource control messages.

11. The method of claim 9, wherein the full-duplexing capability information indicates whether each candidate cell of the plurality of candidate cells are a full-duplex cell or a half-duplex cell.

12. The method of claim 9, wherein the full-duplexing capability information indicates whether the candidate cell supports full-duplexing in a frequency division multiplexing mode or a spatial division multiplexing mode.

13. The method of claim 9, wherein the full-duplexing capability information indicates, for the candidate cell, information related to one or more key performance indicators (KPIs).

14. The method of claim 13, wherein the information related to the one or more KPIs includes statistics related to a downlink and uplink throughput, a packet delivery latency, a scheduling request completion latency, or a random access channel completion latency.

15. The method of claim 9, wherein the full-duplexing capability information further includes an indication of power control settings for the candidate cells.

16. The method of claim 9, wherein the signaling includes information corresponding to priority levels of the plurality of candidate cells.

17. A user equipment (UE) for wireless communication, comprising:
 one or more memories; and
 one or more processors, coupled to the one or more memories, configured to:
  receive signaling that indicates full-duplexing capability information associated with a plurality of candidate cells, wherein the full-duplexing capability information indicates, for a candidate cell of the plurality of candidate cells that supports full-duplexing in a frequency division multiplexing (FDM) mode, information associated with a guard band between a downlink frequency allocation and an uplink frequency allocation, and wherein the guard band has a size that is based at least in part on a worst downlink and uplink beam pair that supports full-duplexing in the FDM mode in the candidate cell; and
  select, from the plurality of candidate cells, a target cell based at least in part on the full-duplexing capability information associated with the plurality of candidate cells.

18. The UE of claim 17, wherein the signaling includes remaining minimum system information or one or more radio resource control messages.

19. The UE of claim 17, wherein the full-duplexing capability information indicates whether each candidate cell of the plurality of candidate cells are a full-duplex cell or a half-duplex cell.

20. The UE of claim 17, wherein the full-duplexing capability information indicates whether the candidate cell supports full-duplexing in a frequency division multiplexing mode or a spatial division multiplexing mode.

21. The UE of claim 17, wherein the full-duplexing capability information indicates, for a candidate cell of the plurality of candidate cells that supports full-duplexing, information related to one or more key performance indicators (KPIs).

22. The UE of claim 17, wherein the full-duplexing capability information indicates historical performance metrics of the candidate cell.

23. The UE of claim 17, wherein the signaling includes timing information associated with the guard band size.

24. A base station for wireless communication, comprising:
 one or more memories; and
 one or more processors, coupled to the one or more memories, configured to:
  determine full-duplexing capability information associated with a plurality of candidate cells, wherein the full-duplexing capability information indicates, for a candidate cell of the plurality of candidate cells that supports full-duplexing in a frequency division multiplexing (FDM) mode, information associated with a guard band between a downlink frequency allocation and an uplink frequency allocation, and wherein the guard band has a size that is based at least in part on a worst downlink and uplink beam pair that supports full-duplexing in the FDM mode in the candidate cell; and
  transmit signaling that indicates the full-duplexing capability information associated with the plurality of candidate cells.

25. The base station of claim 24, wherein the signaling includes remaining minimum system information or one or more radio resource control messages.

26. The base station of claim 24, wherein the full-duplexing capability information indicates whether each candidate cell of the plurality of candidate cells are a full-duplex cell or a half-duplex cell.

27. The base station of claim 24, wherein the full-duplexing capability information indicates whether the candidate cell supports full-duplexing in a frequency division multiplexing mode or a spatial division multiplexing mode.

28. The base station of claim 24, wherein the full-duplexing capability information indicates, for a candidate cell of the plurality of candidate cells that supports full-duplexing, information related to one or more key performance indicators (KPIs).

29. The base station of claim 24, wherein the full-duplexing capability information further includes an indication of power control settings for the candidate cells.

30. The base station of claim 24, wherein the signaling includes information corresponding to priority levels of the plurality of candidate cells.

* * * * *